(12) United States Patent
Jacobsen et al.

(10) Patent No.: US 9,378,028 B2
(45) Date of Patent: Jun. 28, 2016

(54) HEADSET COMPUTER (HSC) WITH DOCKING STATION AND DUAL PERSONALITY

(71) Applicant: Kopin Corporation, Taunton, MA (US)

(72) Inventors: Jeffrey J. Jacobsen, Hollister, CA (US); Christopher Parkinson, Richland, WA (US)

(73) Assignee: Kopin Corporation, Westborough, MA (US)

( * ) Notice: Subject to any disclaimer, the term of this patent is extended or adjusted under 35 U.S.C. 154(b) by 355 days.

(21) Appl. No.: 13/799,533

(22) Filed: Mar. 13, 2013

(65) Prior Publication Data
US 2013/0326208 A1 Dec. 5, 2013

Related U.S. Application Data

(60) Provisional application No. 61/653,471, filed on May 31, 2012.

(51) Int. Cl.
*G06F 1/24* (2006.01)
*G06F 9/00* (2006.01)
(Continued)

(52) U.S. Cl.
CPC ............ *G06F 9/4421* (2013.01); *G02B 27/017* (2013.01); *G06F 1/1632* (2013.01);
(Continued)

(58) Field of Classification Search
CPC . G06F 1/1632; G06F 1/1626; G06F 13/4045; G06F 1/1686; G06F 3/012; G06F 3/013; G06F 3/017; G06F 1/1624; G06F 1/163; G06F 3/011; G06F 3/014; H04M 1/0256; H04M 1/0258; G02B 2027/0178; G02B 27/017

See application file for complete search history.

(56) References Cited

U.S. PATENT DOCUMENTS 5,948,047 A * 9/1999 Jenkins ..................... G06F 1/16
708/141
5,990,793 A 11/1999 Bieback
(Continued)

FOREIGN PATENT DOCUMENTS

WO WO 95/12408 8/1995
WO WO 95/23994 9/1995
(Continued)

OTHER PUBLICATIONS

Notification of Transmittal of the International Search Report and the Written Opinion of the International Search Authority, or the Declaration for PCT/US2013/041344, "Headset Computer (HSC) With Docking Station and Dual Personality", dated Aug. 19, 2013.
(Continued)

*Primary Examiner* — Chun Cao
*Assistant Examiner* — Zhipeng Wang
(74) *Attorney, Agent, or Firm* — Hamilton, Brook, Smith & Reynolds, P.C.

(57) ABSTRACT

An example embodiment of the present invention includes a headset computing device (HSC) having a port for docking. When worn on a user's head, the HSC operates in a "headset" mode and behaves as a hands-free computing device. When docked with a docking station, the HSC operates in a "docked" mode and behaves as a conventional PC using a conventional PC monitor as a display output and keyboard and/or mouse input devices. Operating in the headset mode, the HSC can use automatic speech recognition and head-tracking features to recognize verbal and head-motion commands and presents to the user a specific set of hands-fee applications or application features. When in the docked mode, the headset computing device makes available a different set of applications or application features more suited to keyboard and mouse operation. A common data set stored in the headset memory supports both/all sets of applications.

18 Claims, 7 Drawing Sheets

(51) Int. Cl.
*G06F 9/44* (2006.01)
*G06F 1/16* (2006.01)
*H04M 1/04* (2006.01)
*G02B 27/01* (2006.01)
*H04M 1/05* (2006.01)

(52) U.S. Cl.
CPC .......... *H04M 1/04* (2013.01); *G02B 2027/014* (2013.01); *G02B 2027/0156* (2013.01); *G02B 2027/0187* (2013.01); *H04M 1/05* (2013.01)

(56) References Cited

U.S. PATENT DOCUMENTS

| | | | |
|---|---|---|---|
| 6,010,216 A | 1/2000 | Jesiek | |
| 6,108,197 A | 8/2000 | Janik | |
| 6,204,974 B1 | 3/2001 | Spitzer | |
| 6,325,507 B1 | 12/2001 | Jannard et al. | |
| 6,798,391 B2 | 9/2004 | Peterson, III | |
| 6,853,293 B2 | 2/2005 | Swartz et al. | |
| 6,900,777 B1 | 5/2005 | Hebert et al. | |
| 6,922,184 B2 | 7/2005 | Lawrence et al. | |
| 6,956,614 B1 | 10/2005 | Quintana et al. | |
| 6,966,647 B2 | 11/2005 | Jannard et al. | |
| 7,004,582 B2 | 2/2006 | Jannard et al. | |
| 7,013,009 B2 | 3/2006 | Warren | |
| 7,054,965 B2 * | 5/2006 | Bell et al. | 710/72 |
| 7,082,393 B2 | 7/2006 | Lahr | |
| 7,147,324 B2 | 12/2006 | Jannard et al. | |
| 7,150,526 B2 | 12/2006 | Jannard et al. | |
| 7,213,917 B2 | 5/2007 | Jannard et al. | |
| 7,216,973 B2 | 5/2007 | Jannard et al. | |
| 7,219,994 B2 | 5/2007 | Jannard et al. | |
| 7,231,038 B2 | 6/2007 | Warren | |
| 7,249,846 B2 | 7/2007 | Grand et al. | |
| 7,278,734 B2 | 10/2007 | Jannard et al. | |
| 7,331,666 B2 | 2/2008 | Swab et al. | |
| 7,445,332 B2 | 11/2008 | Jannard et al. | |
| 7,452,073 B2 | 11/2008 | Jannard et al. | |
| 7,461,936 B2 | 12/2008 | Jannard | |
| 7,494,216 B2 | 2/2009 | Jannard et al. | |
| 7,512,414 B2 | 3/2009 | Jannard et al. | |
| 7,574,239 B2 * | 8/2009 | Bjerrum-Niese | 455/569.1 |
| 7,620,432 B2 | 11/2009 | Willins et al. | |
| 7,682,018 B2 | 3/2010 | Jannard | |
| 7,740,353 B2 | 6/2010 | Jannard | |
| 7,744,213 B2 | 6/2010 | Jannard et al. | |
| 7,753,520 B2 | 7/2010 | Fuziak, Jr. | |
| 7,760,898 B2 | 7/2010 | Howell et al. | |
| 7,798,638 B2 | 9/2010 | Fuziak, Jr. | |
| 7,806,525 B2 | 10/2010 | Howell et al. | |
| 7,918,556 B2 | 4/2011 | Lewis | |
| 7,959,084 B2 | 6/2011 | Wulff | |
| 7,966,189 B2 | 6/2011 | Le et al. | |
| 7,967,433 B2 | 6/2011 | Jannard et al. | |
| 7,969,383 B2 | 6/2011 | Eberl et al. | |
| 7,969,657 B2 | 6/2011 | Cakmakci et al. | |
| 7,976,480 B2 | 7/2011 | Grajales et al. | |
| 7,988,283 B2 | 8/2011 | Jannard | |
| 7,997,723 B2 | 8/2011 | Pienimaa et al. | |
| 8,010,156 B2 | 8/2011 | Warren | |
| 8,020,989 B2 | 9/2011 | Jannard et al. | |
| 8,025,398 B2 | 9/2011 | Jannard | |
| 8,072,393 B2 | 12/2011 | Riechel | |
| 8,092,011 B2 | 1/2012 | Sugihara et al. | |
| 8,098,439 B2 | 1/2012 | Amitai et al. | |
| 8,123,352 B2 | 2/2012 | Matsumoto et al. | |
| 8,140,197 B2 | 3/2012 | Lapidot et al. | |
| 8,212,859 B2 | 7/2012 | Tang et al. | |
| 8,814,691 B2 * | 8/2014 | Haddick et al. | 463/42 |
| 2002/0015008 A1 | 2/2002 | Kishida et al. | |
| 2002/0094845 A1 | 7/2002 | Inasaka | |
| 2003/0068057 A1 | 4/2003 | Miller et al. | |
| 2005/0264527 A1 | 12/2005 | Lin | |
| 2006/0132382 A1 | 6/2006 | Jannard | |
| 2008/0198324 A1 | 8/2008 | Fuziak | |
| 2008/0208593 A1 * | 8/2008 | Ativanichayaphong | G10L 15/22 704/275 |
| 2008/0304688 A1 * | 12/2008 | Kumar | 381/370 |
| 2009/0128448 A1 | 5/2009 | Riechel | |
| 2009/0154719 A1 | 6/2009 | Wulff et al. | |
| 2009/0180195 A1 | 7/2009 | Cakmakci et al. | |
| 2010/0020229 A1 | 1/2010 | Hershey et al. | |
| 2010/0033830 A1 | 2/2010 | Yung | |
| 2010/0053069 A1 | 3/2010 | Tricoukes et al. | |
| 2010/0064228 A1 * | 3/2010 | Tsern | G06F 3/1415 715/740 |
| 2010/0121480 A1 | 5/2010 | Stelzer et al. | |
| 2010/0171680 A1 | 7/2010 | Lapidot et al. | |
| 2010/0238184 A1 | 9/2010 | Janicki | |
| 2010/0245585 A1 * | 9/2010 | Fisher | H04M 1/6066 348/164 |
| 2010/0250817 A1 * | 9/2010 | Collopy et al. | 710/304 |
| 2010/0271587 A1 | 10/2010 | Pavlopoulos | |
| 2010/0277563 A1 | 11/2010 | Gupta et al. | |
| 2010/0289817 A1 | 11/2010 | Meier et al. | |
| 2011/0001699 A1 | 1/2011 | Jacobsen et al. | |
| 2011/0089207 A1 | 4/2011 | Tricoukes et al. | |
| 2011/0090135 A1 | 4/2011 | Tricoukes et al. | |
| 2011/0162035 A1 * | 6/2011 | King | G06F 1/1632 726/1 |
| 2011/0214082 A1 | 9/2011 | Osterhout et al. | |
| 2011/0221669 A1 | 9/2011 | Shams et al. | |
| 2011/0221671 A1 | 9/2011 | King, III et al. | |
| 2011/0227812 A1 | 9/2011 | Haddick et al. | |
| 2011/0227813 A1 | 9/2011 | Haddick et al. | |
| 2011/0254698 A1 | 10/2011 | Eberl et al. | |
| 2011/0255050 A1 | 10/2011 | Jannard et al. | |
| 2011/0273662 A1 | 11/2011 | Hwang et al. | |
| 2012/0013843 A1 | 1/2012 | Jannard | |
| 2012/0026071 A1 | 2/2012 | Hamdani et al. | |
| 2012/0056846 A1 | 3/2012 | Zaliva | |
| 2012/0062445 A1 | 3/2012 | Haddick et al. | |
| 2012/0068914 A1 | 3/2012 | Jacobsen | |
| 2012/0105740 A1 | 5/2012 | Jannard et al. | |
| 2012/0114131 A1 | 5/2012 | Tricoukes et al. | |
| 2012/0188245 A1 | 7/2012 | Hyatt | |

FOREIGN PATENT DOCUMENTS

| | | |
|---|---|---|
| WO | WO 00/79327 | 12/2000 |
| WO | WO 2009/076016 | 6/2009 |
| WO | WO 2011/051660 | 5/2011 |
| WO | WO 2012/040386 | 3/2012 |
| WO | WO 2013/180964 A1 | 12/2013 |

OTHER PUBLICATIONS

International Preliminary Report on Patentability dated Dec. 2, 2014 for PCT/US2013/041344.

* cited by examiner

HEADSET COMPUTER (HSC) WITH DOCKING STATION AND DUAL PERSONALITY

RELATED APPLICATION(S)

This application claims the benefit of U.S. Provisional Application No. 61/653,471, filed on May 31, 2012. The entire teachings of the above application are incorporated herein by reference.

BACKGROUND OF THE INVENTION

Mobile computing devices, such as notebook personal computers (PC's), Smartphones, and tablet computing devices, are now common tools used for producing, analyzing, communicating, and consuming data in both business and personal life. Consumers continue to embrace a mobile digital lifestyle as the ease of access to digital information increases with high-speed wireless communications technologies becoming ubiquitous. Popular uses of mobile computing devices include displaying large amounts of high-resolution computer graphics information and video content, often wirelessly streamed to the device. While these devices typically include a display screen, the preferred visual experience of a high-resolution, large format display cannot be easily replicated in such mobile devices because the physical size of such devices is limited to promote mobility. Another drawback of the aforementioned device types is that the user interface is hands-dependent, typically requiring a user to enter data or make selections using a keyboard (physical or virtual) or touch-screen display. As a result, consumers are now seeking a hands-free high-quality, portable, color display solution to augment or replace their hands-dependent mobile devices.

SUMMARY OF THE INVENTION

Developers of software applications (or "apps") have attempted to capitalize on the increased popularity of mobile computing devices by developing a single app that can be used across multiple devices and platforms, for example Smartphones, tablets, and PCs. Developing applications that can be used across multiple devices and platforms is economical for developers because it maximizes return of their work product by enabling the app to be sold to as many consumers as possible. While some challenges exist in developing apps across multiple devices and platforms, currently all such devices (e.g. Smartphones, tablets and PCs) use hands-dependent user interfaces, such as touchscreens and/or keyboards (physical or virtual) and/or pointing devices.

The present application relates to human/computer interfaces. More particularly, the present invention relates to a mobile wireless wearable headset computing device employing a hands-free user interface, which operates using voice commands and tracked head movement, and when docked at a docking station, the headset computing device operates employing a user interface typically associated with a personal computer (PC), for example, using an external full screen monitor for graphical output and using a keyboard and mouse as input devices. Further, the headset computing device makes available a different set of applications or application features more suited to keyboard and mouse operation when in a docked mode than when used in a headset mode as a stand-alone headset computer. A common data set stored in the headset memory supports both/all sets of applications (docked and undocked modes of operation/applications of the headset).

Recently developed micro-displays can provide large-format, high-resolution color pictures and streaming video in a very small form factor. One application for such displays is integration with a wireless headset computer worn on the head of the user, with the display positioned within the field of view of the user, similar in format to eyeglasses, an audio headset, or video eyewear. A "wireless computing headset" device includes one or more small high-resolution micro-displays and optics to magnify the image. The micro-displays can provide super video graphics array (SVGA) (800×600) resolution, quarter high-definition graphics array (qHD) (860×540), extended graphic arrays (XGA) (1024×768) or even higher resolutions. A wearable computer can use a qHD micro-display to provide a virtual 15 inch laptop-sized display. A wireless computing headset contains one or more wireless computing and communication interfaces, enabling data and streaming video capability, and provides greater convenience and mobility than hands dependent devices.

Examples of a mobile wireless wearable headset computing device are Golden-i® Headsets available from Kopin Corporation of Taunton, Mass. For more information concerning such devices, see co-pending U.S. application Ser. No. 12/348,646 entitled "Mobile Wireless Display Software Platform for Controlling Other Systems and Devices," by Parkinson et al., filed Jan. 5, 2009, PCT International Application No. PCT/US09/38601 entitled "Handheld Wireless Display Devices Having High Resolution Display Suitable For Use as a Mobile Internet Device," by Jacobsen et al., filed Mar. 27, 2009, and U.S. Application No. 61/638,419 entitled "Improved Headset Computer," by Jacobsen et al., filed Apr. 25, 2012, each of which are incorporated herein by reference in their entirety.

An example method of operating a headset computer includes, providing a docking station for a headset computer, executing a hands-free first version of a subject application on the headset computer, and executing a different version of the subject application on the headset computer when the headset computer is operatively coupled to the docking station, wherein the hands-free version and the different version utilize a common data set stored in a memory of stored in memory of the headset computer.

Another example method of operating a headset computing device includes, determining whether the headset computing device is in a headset state or a docked state communicatively coupled to a docking station, operating the headset computing device in a headset mode or a docked mode based on the determined state, executing an application on the headset computing device, enabling and disabling application features according to the headset mode or the docked mode wherein the headset mode enables a hands-free user interface and disables a hands-dependent user interface, and the docked mode enables the hands-free dependant user interface and disables the hands-free user interface, and accessing a common application data set stored in a memory module of the headset computer according to the executed application.

Enabling the hands-free user interface can further include, using automatic speech recognition (ASR) and head tracking (HT) user inputs to interface with the application according to the headset mode. The enabling and disabling application features can further include enabling read-only and disabling write user permissions according to the headset mode. The hands-free user interface can further include rendering a headset version of a graphical user interface compatible with automatic speech recognition and head-tracking inputs through a micro-display of the headset computing device according to the headset mode.

The hands-dependent user interface, according to the docked mode, can further include using a keyboard and pointing device user inputs to interface with the application. The enabling and disabling application features can further include enabling write and disabling read-only user permissions. The hands-dependent user interface can further include rendering a graphical user interface through a monitor communicatively coupled to the docking station.

Example methods of operating the headset computing device can further include executing the application on the headset computing device wherein the application is a word processing application, a spreadsheet application, a presentation application, or an Internet browser application on the headset computing device. Example methods of operating the headset computing device in the docked mode can further include recharging a rechargeable battery of the headset computing device. The rechargeable battery can power operations of the headset computing device in the headset mode.

Further example embodiments include a dual-mode headset computing device, including a processor communicatively coupled to a micro-display and a memory module, operating in a headset mode or docked mode, a common data set stored in the memory module, a docking station, including a docking port enabling operational coupling to the headset computing device in a docked state, the docked mode being based on a determination of the docked state, an application executed by the processor including application features being enabled or disabled according to the headset mode or the docked mode, wherein the headset mode enables a hands-free user interface and disables a hands-dependent user interface, and the docked mode enables the hands-dependent user interface and disables the hands-free user interface, and the common data set being accessed according to the application.

Example embodiments of the hands-free user interface can further include an automatic speech recognition module and a head-tracking module for receiving user input to interface with the application, during operation in the headset mode. The application features can further include an enabled read-only user permission and a disabled write user permission in the headset mode. The micro-display can render a headset version of a graphical user interface in the headset mode.

The hands-dependent user interface can further include a keyboard and a pointing device for receiving user inputs to interface with the application. Application features can further include an enabled write user permission and a disabled read-only user permission in the docked mode. Further, the hands dependent user interface can include a monitor, communicatively coupled to the docking station, for rendering a graphical user interface compatible with the keyboard and pointing device. The application can be a word processing, spreadsheet, presentation, or an Internet browsing application.

Example embodiments of the headset computing device can further include a rechargeable battery for supplying power to the headset computing device while operating in the headset mode and recharging the battery while in the docked mode.

Example embodiments of the can further include a non-transitory computer program product for operating a headset computing device, the computer program product comprising a computer readable medium having a computer readable instructions stored thereon, which, when loaded and executed by a processor, cause the processor to determine whether the headset computing devices in a headset state or a docked state communicatively coupled to a docking station, operate the headset computing device in a headset mode or a docked mode based on the determined state, execute an application on the headset computing device, enable and disable application features according to the headset mode or docked mode, wherein the headset mode enables a hands-free user interface and disables a hands-dependent user interface, and the docked mode enables the hands-dependent user interface and disabled the hands-free user interface, and access a common application data set stored in a memory module of the headset computer according to the executed application.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1A:
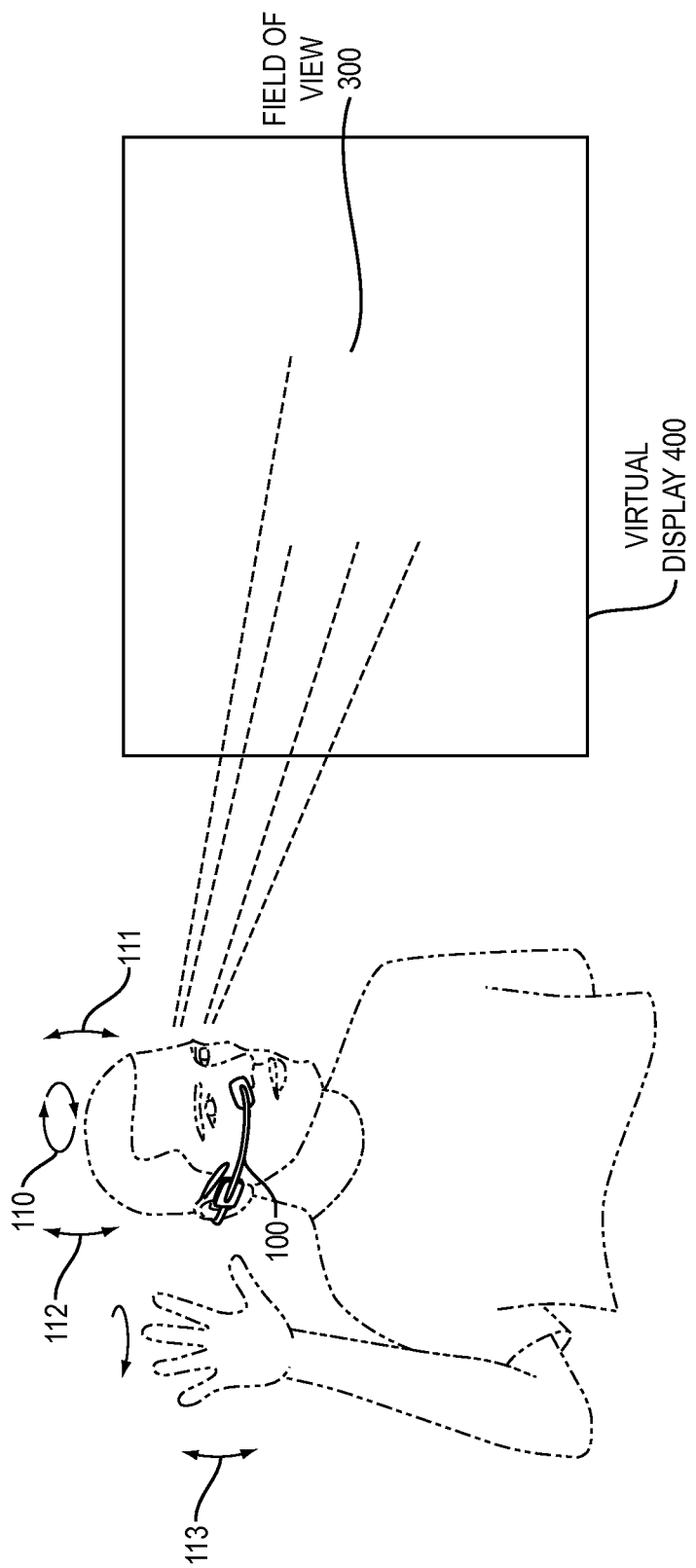
FIG. 1A illustrates an example embodiment of a mobile wireless wearable headset computing device employing a hands-free user interface using head movement and hand gestures as user interface controls.

A description of example embodiments of the invention follows.

An example embodiment, according to principles of the present invention, includes a headset computing device, also referred to herein as a headset computer (HSC), having a port for docking. When worn on a user's head, the HSC can operate in a "headset" mode and behave as a hands-free computing device. When docked with a docking station, the HSC can behave in a "docked" mode and behave as a typical personal computer (PC) that can use a full screen monitor as a display output and a keyboard and/or mouse as input devices.

Operating as a hands-free device in the headset mode, the HSC can use automatic speech recognition and head-tracking features to recognize verbal and head-motion commands. In the headset mode, the HSC presents to the user a specific set of specified hands-fee applications or application features that use a micro-display, automatic speech recognition and head-tracking features.

Operating as a typical PC in the docked mode, the HSC can use a traditional hands-dependent interface including a graphical user interface (GUI) based on the user inputting commands using a keyboard and/or mouse (or other pointing device). In the docked mode, the HSC presents to the user a specific set of specified hands-dependent applications or application features that use the keyboard and/mouse interface. The docking port integrated with the HSC enables the HSC to dock with a docking station. While docked, the docking station enables: recharging of the HSC battery; video output from the HSC to a conventional PC monitor; audio output from HSC to standard audio speakers; audio input from a microphone; keyboard and mouse operation; Internet connectivity, for example via Ethernet.

The applications, whether hands-fee applications or hands-dependent applications (e.g., traditional PC application) or application features, can share the same application data, since the data can be stored in the HSC's memory, such as a hard disk. Applications can include PC applications, such as Word, Excel, Internet Explorer, etc., all of which are operated in a traditional manner using a mouse and keyboard. While the HSC operates in either mode, i.e., headset mode or docked mode, the application can assess the same data files so that both modes share the same data files. For example the user can create new documents in docked mode (also referred to herein as "desktop" mode or PC mode), which can be viewed thereafter in headset mode (also referred to herein as "hands-free" mode). In another example, the hands-free user can take snapshot photographs via a camera operatively connected (preferably integrated) to the HSC, which can then be viewed and edited in desktop mode. Therefore, the HSC can operate as a dual-personality device that serves both an "Office User" and a "Mobile Worker". The term "Application Feature", as used herein, can refer to a number of computer software controlled elements including: GUI features, such as presenting available verbal and head-motion commands, file operations including, create, open, write, read, etc. or any combination thereof.

The automatic speech recognition feature of the HSC enabling control of the device using voice commands may be a useful feature. The automatic speech recognition feature can be enabled, for example, by using a speech recognition product, such as those available from Nuance Communications, Inc. 1 Wayside Road, Burlington, Mass. 01803. In addition, the head-tracking feature can be enabled using, for example, a six-axis or nine-axis sensor module tracker available from Hillcrest Laboratories, Inc., 15245 Shady Grove Road, Suite 400, Rockville, Md. 20850.

The operating systems and/or device drivers used for the HSC can be modified to take into account whether the HSC is in the docking station or operating away from the docking station (e.g., on a user's head). Selection of the operating mode can be made automatically, such as by using an input that detects when the HSC is docked.

As will be understood, the operation, control, and visual displays generated by the hands-free applications are different from the corresponding elements of a regular desktop PC application. The visual presentation of the information on the micro-display and desktop display preferable are different.

In one embodiment the HSC may take the form of the HSC described in a co-pending U.S. patent application Ser. No. 13/018,999, entitled "Wireless Hands-Free Computing Headset With Detachable Accessories Controllable By Motion, Body Gesture And/Or Vocal Commands" by Jacobsen et al., filed Feb. 1, 2011, which is hereby incorporated by reference its entirety.

Figure 1B:
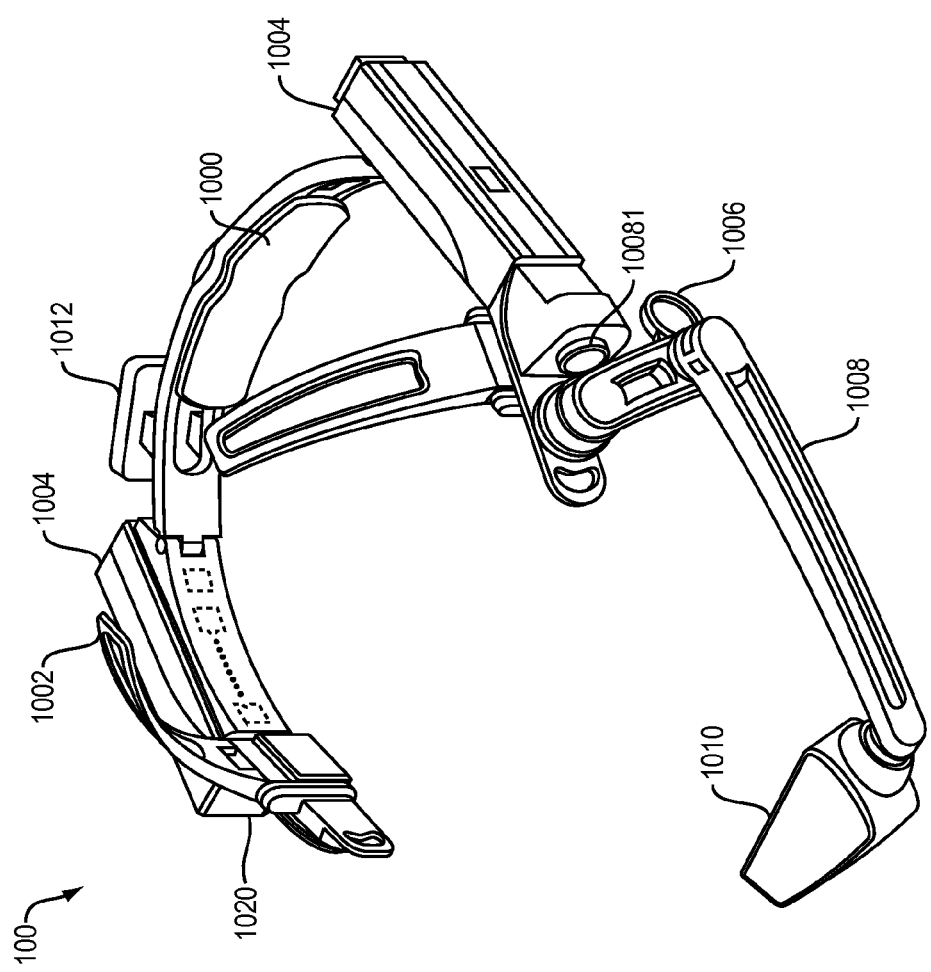
FIG. 1B is a perspective view of an example embodiment of a headset computing device.

FIGS. 1A and 1B show an example embodiment of a wireless computing headset device 100 that incorporates a high-resolution (VGA or better) micro-display element 1010, and other features described below. HSC 100 can include audio input and/or output devices, including one or more microphones, speakers, geo-positional sensors (GPS), three to nine axis degrees of freedom orientation sensors, atmospheric sensors, health condition sensors, digital compass, pressure sensors, environmental sensors, energy sensors, acceleration sensors, position, attitude, motion, velocity and/or optical sensors, cameras (visible light, infrared, etc.), multiple wireless radios, auxiliary lighting, rangefinders, or the like and/or an array of sensors embedded and/or integrated into the headset and/or attached to the device via one or more peripheral ports (not shown in detail in FIG. 1B). Typically located within the housing of headset computing device 100 are various electronic circuits including, a microcomputer (single or multi-core processors), one or more wired and/or wireless communications interfaces, memory or storage devices, various sensors and a peripheral mount or mount, such as a "hot shoe."

Example embodiments of the HSC 100 can receive user input through sensing voice commands, head movements, 110, 111, 112 and hand gestures 113, or any combination thereof as illustrated in FIG. 1A. Microphone(s) operatively coupled or preferably integrated into the HSC 100 near micro-display 1010 can be used to capture speech commands which are then digitized and processed using automatic speech recognition (ASR) techniques. Gyroscopes, accelerometers, and other micro-electromechanical system sensors can be integrated into the HSC 100 and used to track the user's head movement to provide user input commands. Cameras, such as camera 1008, or other motion tracking sensors can be used to monitor a user's hand gestures for user input commands. Such a user interface overcomes the hands-dependant formats of other mobile devices.

FIG. 1B is a perspective view showing some details of an example embodiment of a headset computer 100. The example embodiment HSC 100 generally includes, a frame 1000, articulated supports 1002, housings 1004, speaker 1006, cantilever, or alternatively referred to as an arm or boom 1008 with a built in microphone(s), micro-display subassembly 1010, integrated camera 10081, and peripheral port 1020.

A head worn frame 1000 and articulated supports 1002 are generally configured so that a user can wear the headset computer device 100 on the user's head. Housings 1004 are generally low profile units which house the electronics, such as the microprocessor, memory or other storage device, low power wireless communications device(s), along with other associated circuitry. Speakers 1006 provide audio output to the user so that the user can hear information, such as the audio portion of a multimedia presentation, or audio prompt, alert, or feedback signaling recognition of a user command.

A micro-display subassembly 1010 is used to render visual information, such as images and video, to the user. The micro-display 1010 is coupled to the arm 1008. The arm 1008 generally provides physical support such that the micro-display subassembly 1010 is able to be positioned within the user's field of view, preferably in front of the eye of the user or within its peripheral vision preferably slightly below or above the eye. The arm 1008 also provides the electrical or optical connections between the micro-display subassembly 1010 and the control circuitry housed within housing unit 1004.

According to aspects that will be explained in more detail below, the HSC 100 with micro-display 1010 can enable an end-user to select a field of view 300 (FIG. 1A) within a much larger area defined by a virtual display 400. The user can typically control the position, extent (e.g., X-Y or 3D range), and/or magnification of the field of view 300.

While the example embodiments of an HSC 100 shown in FIGS. 1A-1B are monocular micro-displays presenting a single fixed display element supported within the field of view in front of the face of the user with a cantilevered boom, it should be understood that other mechanical configurations for the auxilliary display device HSC 100 are possible.

Figure 2:
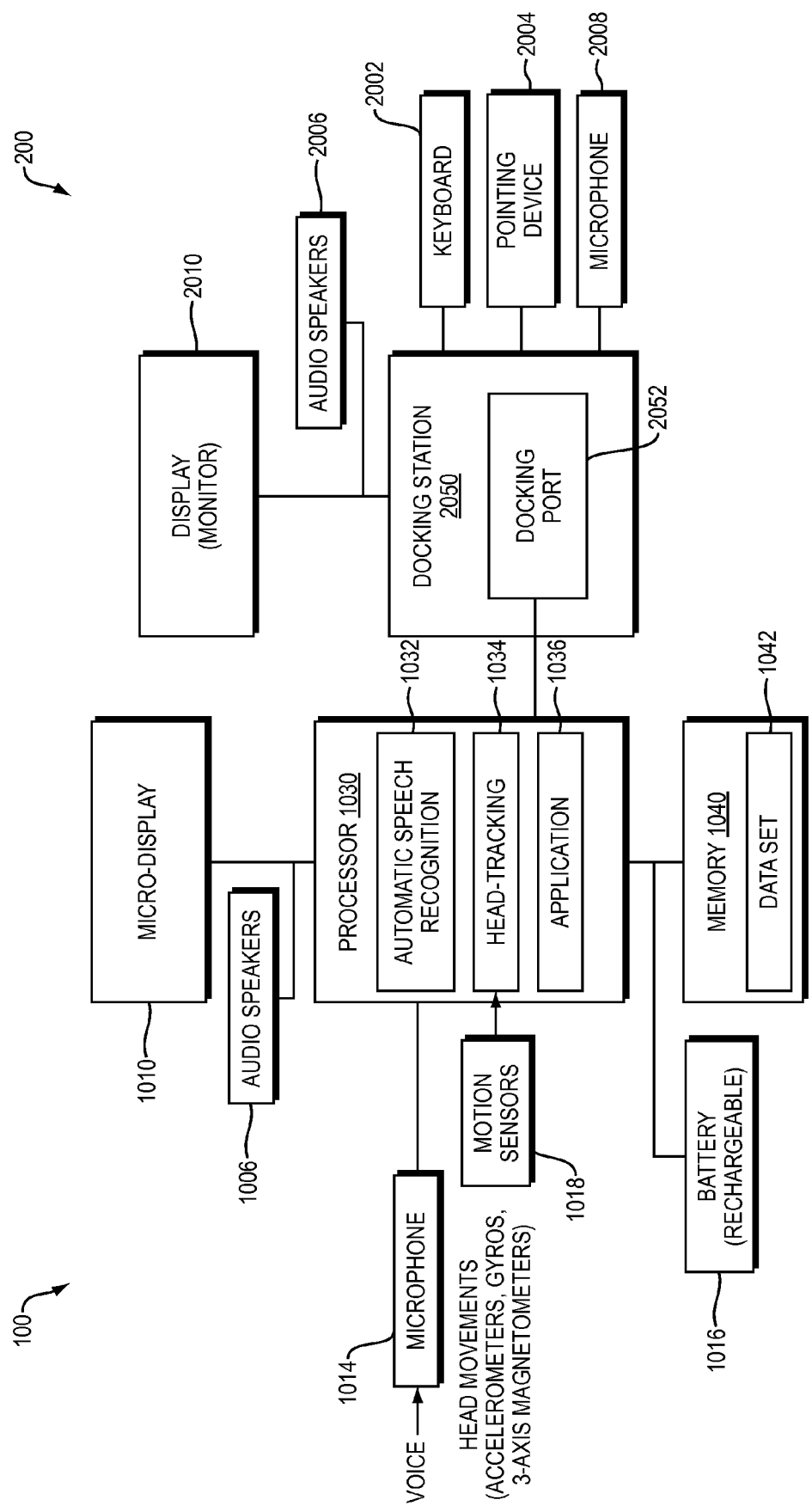
FIG. 2 is a top level functional block diagram of the headset computing device docked at a docking station.

FIG. 2 is a high-level schematic diagram of an example embodiment of the headset computing device and docking station. The headset computing device 100 includes micro-display 1010, processor 1030, automatic speech recognition (ASR) module 1032, head-tracking (HT) module 1034, software application 1036, memory module 1040, data set 1042, rechargeable battery 1016, audio speakers 1006, microphone 1014, and accelerometers, gyros, three axis magneto meters. Docking station 200 can include docking station unit 2050, docking port 2052, display (monitor) 2010, audio speakers 2006, keyboard 2062, pointing device 2064, and optionally microphone 2066.

A digital processor 1030 is operatively coupled to micro-display 1010, memory module 1040, battery 1016, audio speakers 1006, and user input devices including microphone 1014 (microphones) and motion sensors 1018. The processor 1030 uses automatic speech recognition module 1032 and head tracking module 1034 to convert signals received from the hands-free user interface sensors into control commands for executing application 1034. The application 1036 can access a data set 1042 stored in a memory module 1040. While operating in a headset mode, processor 1030 outputs user interface to micro-display 1010 and audio speakers 1006. A battery 1016 powers the HSC 100 while in the headset mode. (It should be recognized by those of skill in the art that memory 1040 while preferably located in headset computing device 100, does not have to be located in HSC 100 but merely accessible to HSC 100, e.g., a cloud-based memory module).

A docking station unit 2050, (also referred to herein as a docking station) includes docking port 2052. The docking port 2052 communicatively couples to HSC 100 enabling a communications and power link between the docking station 200 and the HSC 100. The docking station 2050 is further communicatively coupled to a display (monitor) 2010, for example a conventional computer monitor, audio speakers 2006, keyboard 2062, pointing device 2064, for example a mouse, and optionally a microphone 2066. The display monitor 2010 displays graphical user information to a user when the headset is operating in docked mode. Further, while in docked mode, the keyboard 2062 and pointing device 2064 are used to capture user input at docking station 2050 and communicate such input to processor 1030 so that application 1036 can be controlled. The microphone 2066 can optionally be used as a speech input for the headset computing device 100 while in docking station mode and can be processed by automatic speech recognition module 1032 in a manner similar to the speech control processes in the headset mode.

Figure 3A:
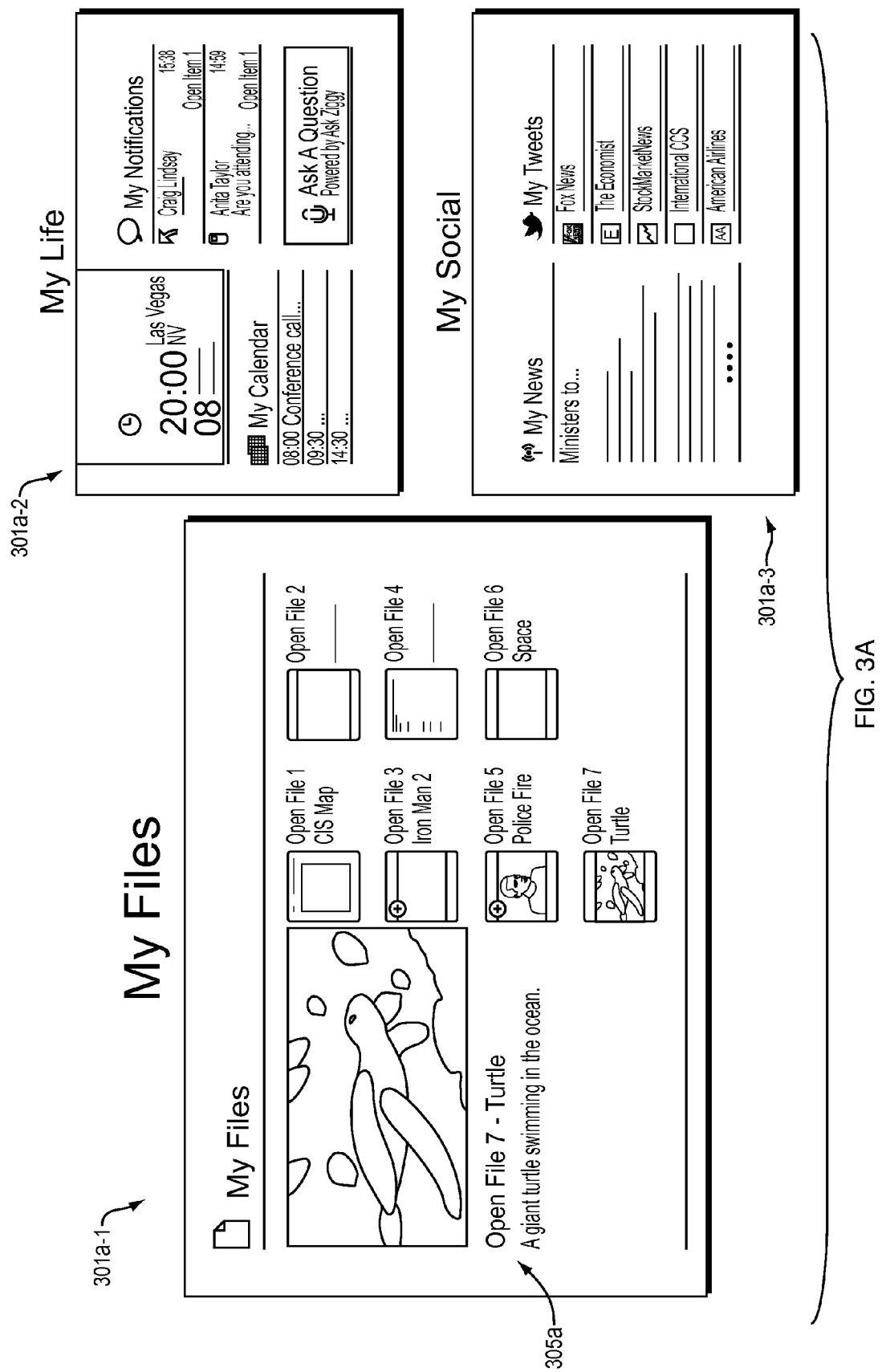
FIGS. 3A-3B illustrate example displays of graphical user interfaces on the headset computing device and while used in a headset mode and while used in a docked mode.
Figure 3B:
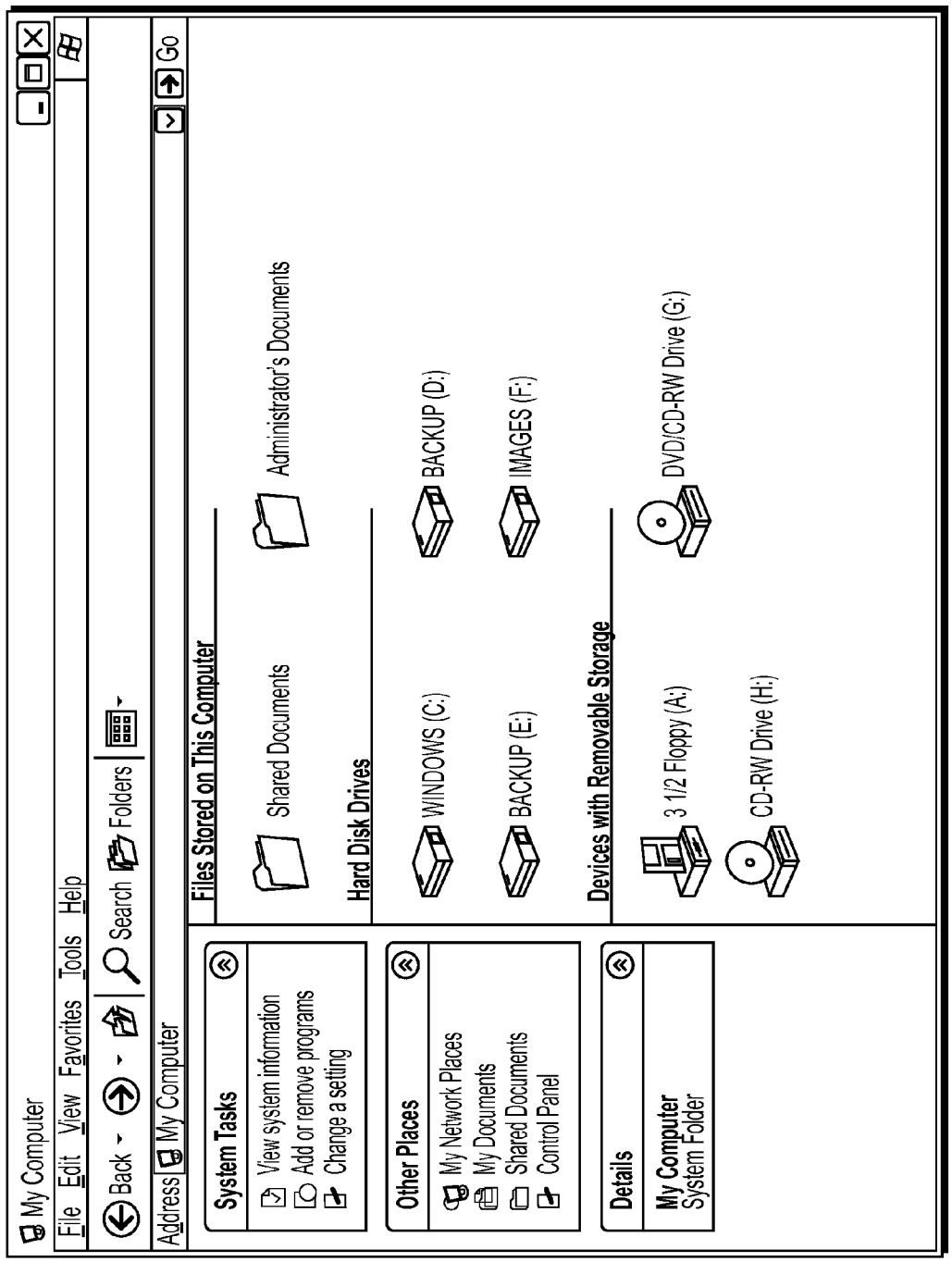

FIGS. 3A and 3B illustrate example graphical user interfaces displayed by the HSC 100 for headset mode and docked mode operation.

FIG. 3A is an example illustrating three different screen displays 301a-1-301a-3, which can be navigated hands-free, using speech and head-motion commands. The "My Files" screen display 301a-1 illustrates a headset mode GUI for a file explorer application. A file explorer application, also referred to as a file manager or file browser, is a computer program that provides the user with an interface to work with file systems. The most common operations performed on files or groups of files are: create, open, edit, view, print, play, rename, move, copy, delete, search/find, and modify file attributes, properties and file permissions. In accordance with examples of the present invention, some such common operations may be limited (e.g., non-functional) depending upon the mode of operation of the HSC (i.e., headset mode of docked mode). For example, in headset mode operations such as open, view, print, play, and search/find may be operable, while other operations are not. As seen in display screen 301a-1, available voice commands 305a, such as "open file 7", can be visually presented to the user.

The "My Life" display screens 301a-2 of the HSC 100 operating in the headset mode can provide the user visual information such as time, date and calendar scheduling information, as well as notifications and the available voice commands associated with such features. For example, the voice command "open item 2" can open a voicemail and or visual voicemail message.

The "My Social" display screens 301a-3 of the HSC 100 operating in the headset mode can provide the user with the latest news, social network updates (for example, Tweets®) and other need-to-know information. (Tweet is a registered trademark of Twitter, Inc. of 1355 Market Street, Suite 900, San Francisco, Calif. 94103.)

FIG. 3B is an example illustrating a screen display in the docked mode. Screen display 301b illustrates a docked mode GUI for a file explorer application. The file explorer application can display files in a hierarchy and can perform common operations on files or groups of files. In accordance with examples of the present invention, many operations may not be limited (unrestricted) during operation of the HSC in docked mode. For example, in docked mode operations such as open, create, open, edit, view, print, play, rename, move, copy, delete, search/find, and modify file attributes, properties and file permissions may all be available to the user. As can be seen from the screen display 301b, a mouse (or other pointing device) can be used to navigate the file explorer application by selecting GUI icons. As also can be seen from the screen display 301b, a keyboard can be used to type the address of a file location to navigate to the file location.

Figure 4:
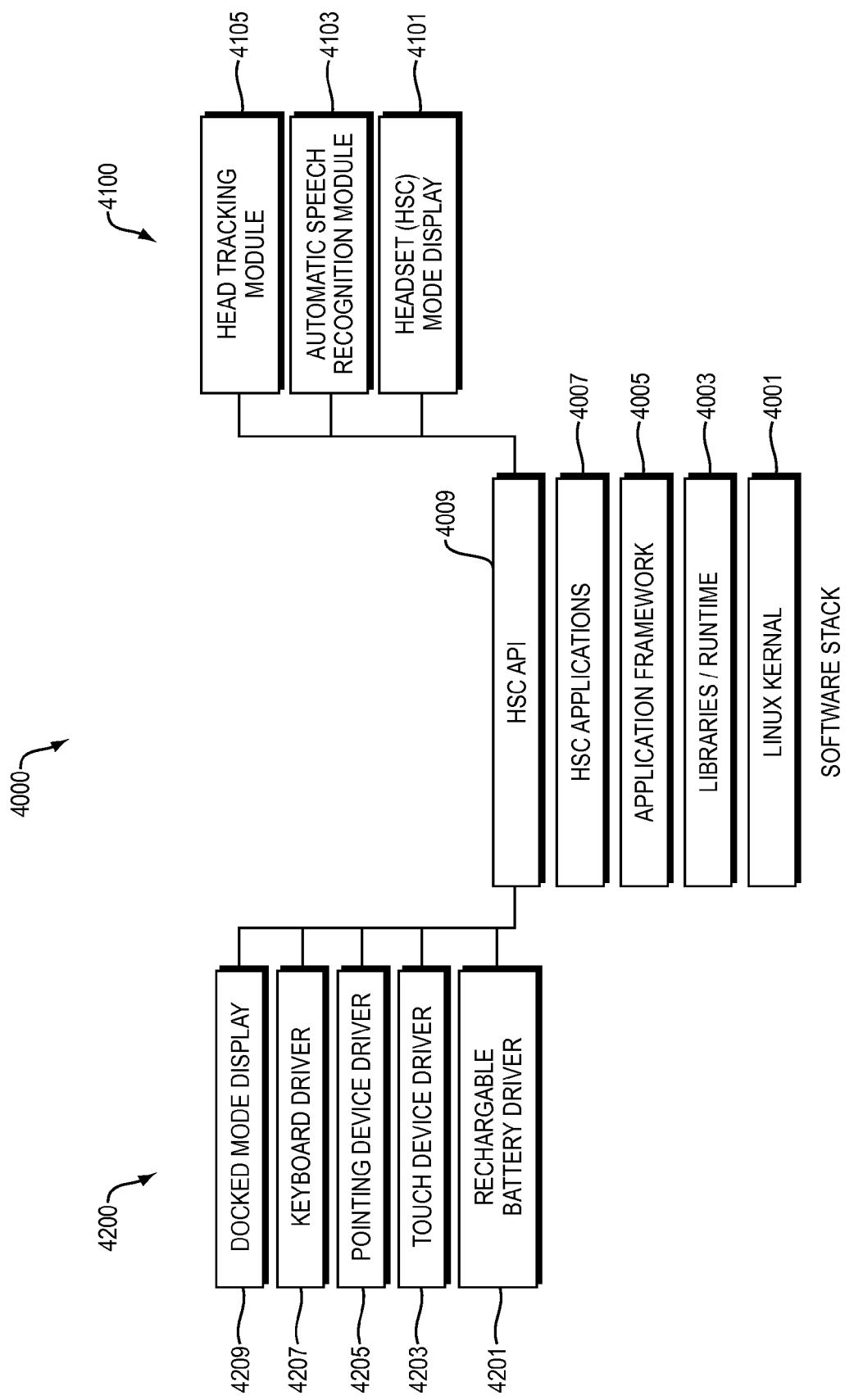
FIG. 4 is a diagram illustrating software stacks for the headset computing device.

FIG. 4 is a high-level software diagram illustrating different software layers and their relationship to operating the HSC 100 in a headset mode and a docked mode. A HSC software stack 4000 includes a kernal of an operating system (OS), such as the LINUX kernal 4001, libraries and runtime libraries for implementing functions built into the programming language during the execution of an application, such as those of libraries/runtime layer 4003, and an application framework for implementing the standard structure of an application, such as application framework 4005, and an application which can run on top of the OS kernal, libraries and frameworks, such as HSC applications 4007. The software stack 4000 can further include a HSC application programming interface (API) 4009, which determines the mode of operation, either headset mode or docked mode. Software stack 4100 is used during operation in headset mode. Headset mode software stack 4100 includes a head tracking module driver 4105, and automatic speech recognition module 4103, which may access different layers of the software stack 4000, and headset HSC mode display 4101, which drives the micro-display 1010.

A docked mode software stack 4200 is used during operation of the HSC 100 in a docked mode, and includes a rechargeable battery driver module 4201, a touch device driver 4203, which can control input from a user through a touch device such as a touch screen or other capacitive other input touch input device such as a trackpad, pointing device driver 4205, such as a optical mouse, keyboard driver 4207 and docked mode display driver 4209 which displays the graphical user interface typically through a monitor 2010.

Figure 5:
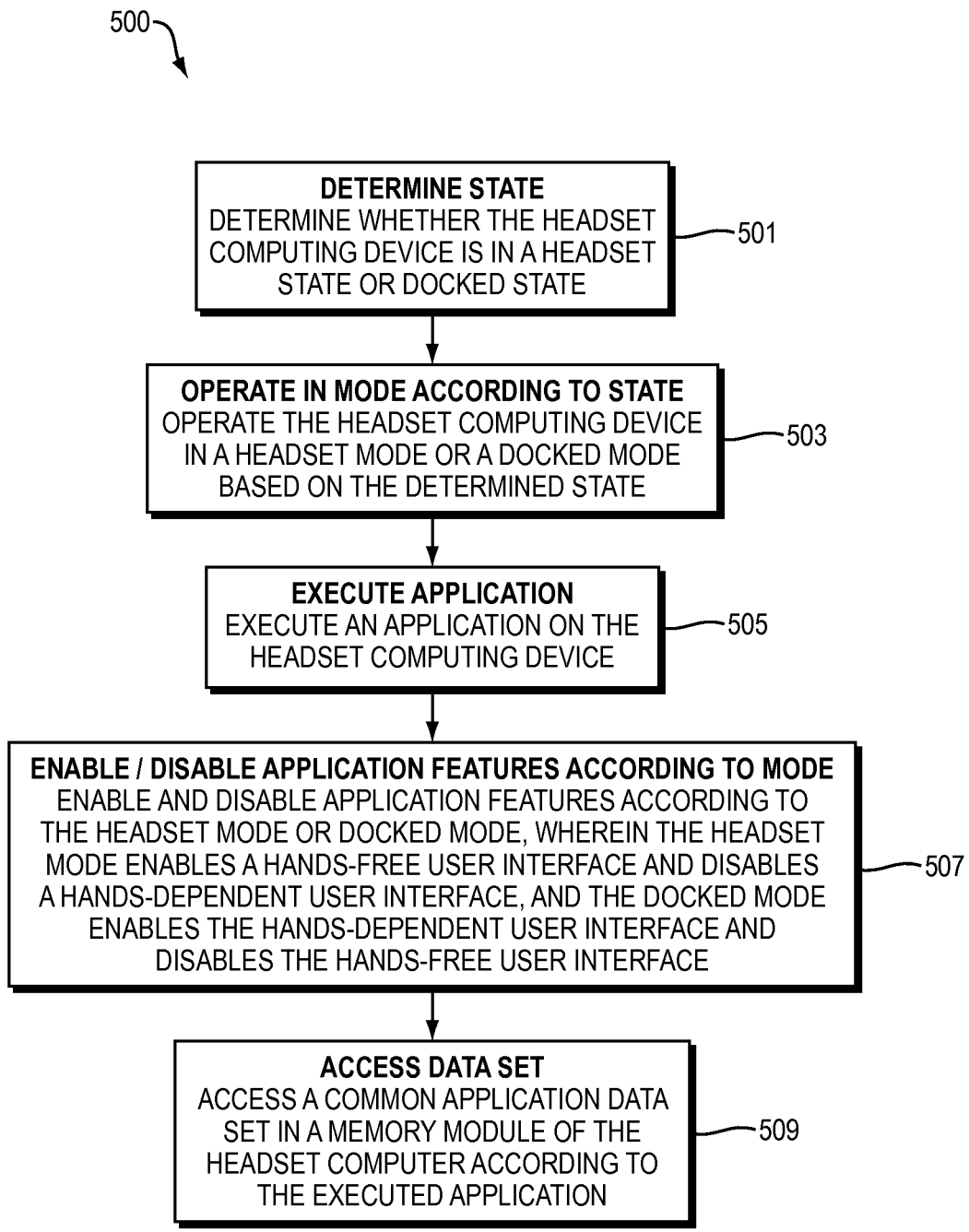
FIG. 5 is a flow diagram of a method of interacting with the headset computing device in accordance with aspects of the present invention.

FIG. 5 is a high-level flow diagram of an example method of operating a dual personality headset computer 500. The example method of operating a dual personality headset computer 500 includes determining state (step 501), in which it is determined whether the headset computing device is in a headset state or a docked state. (The headset computing device in docked state is operatively coupled to a docking station). Next, the HSC 100 operates in a mode according to the determine state (step 503). The headset computer operates in a headset mode or a docked mode based on the determined state. Next, application features are enabled or disabled according to the mode of operation (step 507). Application features can include: (i) when the HSC 100 is in the headset mode, enabling a hands-free user interface and disabling a hands-dependent user interface; when the HSC 100 is in the docked mode, enabling the hands-dependent user interface and disabling the hands-free user interface. Next, a data set stored in the memory of the HSC 100 is accessed (step 509). The common application data set in a memory module of the headset computer is accessed according to the executed application.

Further example embodiments of the present invention may be configured using a computer program product; for example, controls may be programmed in software for implementing example embodiments of the present invention. Further example embodiments of the present invention may include a non-transitory computer readable medium containing instruction that may be executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of operating a headset computer, comprising:
providing a docking station for a headset computer;
executing a hands-free first version of a subject application on the headset computer, the hands-free first version of the subject application having a hands-free mode software stack; and
executing a different, non-hands-free version of the subject application on the headset computer when the headset computer is operatively coupled to the docking station, the non-hands-free version of the subject application having a non-hands-free mode software stack that is separate from the hands-free mode software stack;
enabling and disabling features of the subject application according to execution of the hands-free first version of the subject application, or execution of the non-hands-free version of the subject application; and
enabling read-only and disabling write user permissions when executing the hands-free first version of the subject application;
wherein the hands-free version and the different, non-hands-free version each (i) utilize a common data set stored in a memory module of the headset computer and (ii) utilize a shared common software stack portion.

2. A method of operating a headset computing device comprising:
determining whether the headset computing device is in a headset state or a docked state operatively coupled to a docking station;
operating the headset computing device in a headset mode or a docked mode based on the determined state;
executing an application on the headset computing device;
enabling and disabling application features according to the headset mode or the docked mode by selectively enabling a headset mode software stack, or a docked mode software stack that is separate from the headset mode software stack, respectively, wherein the headset mode enables a hands-free user interface and disables a hands-dependent user interface, and the docked mode enables the hands-dependent user interface and disables the hands-free user interface;
enabling read-only and disabling write user permissions when operating the headset computing device in the headset mode; and
accessing, by each of the headset mode software stack and the docked mode software stack, a common application data set stored in a memory module of the headset computer according to the executed application and utilizing, by each of the headset mode software stack and the docked mode software stack, a shared common software stack portion of the application.

3. The method of operating a headset computing device according to claim 2, wherein enabling the hands-free user interface further includes using automatic speech recognition and head-tracking user inputs to interface with the application according to the headset mode.

4. The method of operating a headset computing device according to claim 3, wherein the hands-free user interface further includes rendering a headset version of a graphical user interface compatible with automatic speech recognition and head-tracking inputs through a micro-display of the headset computing device.

5. The method of operating a headset computing device according to claim 2, wherein the hands-dependent user interface further includes using a keyboard and a pointing device user inputs to interface with the application according to the docked mode.

6. The method of operating a headset computing device according to claim 5, wherein the enabling and disabling application features further includes enabling write and disabling read-only user permissions.

7. The method of operating a headset computing device according to claim 5, wherein the hands-dependent user interface further includes rendering a graphical user interface through a monitor communicatively coupled to the docking station.

8. The method of operating a headset computing device according to claim 2, wherein executing the application on the headset computing device further includes executing a word-processing application, a spreadsheet application, a presentation application, or an Internet browser application on the headset computing device.

9. The method of operating a headset computing device according to claim 2, wherein operating the headset computing device in the docked mode further including recharging a rechargeable battery of the headset computing device, the rechargeable battery powering operation of the headset computing device in the headset mode.

10. A dual-mode computing device comprising:
a headset computing device, including a processor communicatively coupled to a micro-display and a memory module, operating in a headset mode or a docked mode;
a common data set stored in a memory module and a shared software stack;
a docking station, including a docking port enabling operational coupling to the headset computing device in a docked state, the docked mode being based on a determination of the docked state;
an application executed by the processor including application features being enabled or disabled according to the headset mode or the docked mode,
the headset mode enables a hands-free user interface and utilizes a headset mode software stack, disables a hands-dependent user interface and a docked mode software stack that is separate from the hands-free mode software stack, and enables read-only and disables write user permissions, and
the docked mode enables the hands-dependent user interface and utilizes the docked mode software stack, and disables the hands-free user interface and the headset mode software stack, the shared software stack being executed for both the headset mode and the docked mode, and the common data set being accessed, by each of the headset mode software stack and the docked mode software stack, according to the application.

11. The dual-mode computing device of claim 10, wherein the hands-free user interface further includes an automatic speech recognition module and a head-tracking module for receiving user input to interface with the application.

12. The dual-mode computing device of claim 11, wherein the micro-display renders a headset version of a graphical user interface in the headset mode.

13. The dual-mode computing device of claim 10, wherein the hands-dependent user interface further includes a keyboard and a pointing device for receiving user input to interface with the application.

14. The dual-mode computing device of claim 13, wherein the application features further includes an enabled write user permission and a disabled read-only user permission in the docked mode.

15. The dual-mode computing device of claim 13, further including a monitor, communicatively coupled to the docking station, for rendering a graphical user interface compatible with the keyboard and pointing device.

16. The dual-mode computing device of claim 10, wherein the application is a word-processing application, a spreadsheet application, a presentation application, or an Internet browser application.

17. The dual-mode computing device of claim 10, wherein the headset computing device further includes a rechargeable battery for supplying power to the headset computing device operating in the headset mode and recharging in the docked mode.

18. A non-transitory computer program product for operating a headset computing device, the computer program product comprising a computer readable medium having computer readable instructions stored thereon, which, when loaded and executed by a processor, cause the processor to:
determine whether the headset computing device is in a headset state or a docked state communicatively coupled to a docking station;
operate the headset computing device in a headset mode or a docked mode based on the determined state;
execute an application on the headset computing device;
enable and disable application features according to the headset mode or the docked mode, wherein the headset mode enables a hands-free user interface and hands-free software stack, and disables a hands-dependent user interface and hands-dependent software stack, and the docked mode enables the hands-dependent user interface and hands-dependent software stack that is separate from the headset mode software stack, and disables the hands-free user interface and hands-free software stack;
enable read-only and disable write user permissions when operating the headset computing device in the headset mode;
access, by each of the headset mode software stack and the docked mode software stack, a common application data set stored in a memory module of the headset computer according to the executed application and utilize, by each of the headset mode software stack and the docked mode software stack, a shared common software stack portion of the application.

* * * * *